United States Patent Office 3,736,172
Patented May 29, 1973

3,736,172
METHOD TO PREVENT CONDENSATE ACCUMULATION ON A SURFACE
Richard Delano, Box 96 11785, and Chad J. Raseman, 15 Blueberry Ridge Road 11733, both of Setauket, N.Y.
No Drawing. Continuation-in-part of application Ser. No. 827,069, May 22, 1969. This application Aug. 23, 1971, Ser. No. 174,235
Int. Cl. B32b 27/06
U.S. Cl. 117—95
8 Claims

ABSTRACT OF THE DISCLOSURE

The interior surface of a plastic enclosure having therein a high humidity, such as a plastic greenhouse or pool enclosure, is coated to prevent dripping of condensate. The method consists of coating the interior surface with a dilute aqueous dispersion of a surfactant and colloidal alumina.

---

This application is a continuation-in-part application based upon the inventors' United States patent application Ser. No. 827,069, filed May 22, 1969, and entitled "Method To Prevent Condensate Accumulation on a Surface," now abandoned.

This invention relates to a method for the prevention of condensate buildup on the interior surfaces of greenhouse walls and ceilings, swimming pool enclosures, tennis court enclosures, and other types of plastic enclosures.

Greenhouse plants require a fairly high temperature. Further, the plants require sunlight for photosynthesis. In order to take full advantage of the sun's light, often greenhouses are made substantially of flexible or rigid sheets of plastic. During photosynthesis, or when heated by sunlight or other means, plants release water vapor into the atmosphere. This water vapor rises. Since the temperature outside of the greenhouse is often lower than the temperature inside, the water vapor tends to condense on the interior surface of the greenhouse plastic surfaces, forming a mist thereon. This mist is disadvantageous as it tends to reduce transmission of the sunlight through the glass or plastic. Further, the condensed moisture builds up and begins to drip onto plants, persons or the floor below. The dripping water will mar flowers and reduce their market value. In addition, the dripping is unpleasant to those with the greenhouse and the wet floor may be dangerous.

A pool enclosure presents a similar problem. Evaporation from the large surface area of the pool causes its plastic enclosure to become covered with a mist. The mist may be unpleasant to look at. More importantly, the dripping of the water may make staying in the enclosure unpleasant.

The instant invention attempts to resolve the above-described problems. The method of the invention renders the interior surface of the plastic greenhouse or pool enclosure walls and ceilings hydrophilic, thereby preventing drops or driplets of water from forming According to the method of the present invention, the inner plastic surfaces of the greenhouse walls and roof are treated with an anti-mist formulation. The formulation is either applied to the surface as a spray or as a liquid. In the latter case it is applied either with an absorbent applicator or with a roller-type applicator. Once applied, the formulation dries to form an invisible capillary film network. The film network acts as a runoff for moisture. The rising moisture condenses and becomes entrapped in the interstices of the film network and is harmlessly conducted by capillary action down the side walls of the greenhouse. The formulation employed in the method of the invention comprises an aqueous dispersion of a colloidal alumina, as, for example, "Baymal" or "Alon."

"Alon," a registered trademark of Cabot Corporation, is a fumed alumina of different crystalline forms consisting predominantly of the gamma modification. "Alon" is made by the hydrolysis of aluminum chloride in a flame process.

"Baymal," a registered trademark of Du Pont, is a colloidal alumina. It is a white, free-flowing powder consisting of clusters of minute fibrils of boehmite (AlOOH) alumina.

The high positive surface charge on the particle of "Alon" and "Baymal" in an aqueous dispersion thereof results in said particles having a rapid interaction with negative hydrophobic surfaces, as, for example, plastic greenhouse or pool enclosure surfaces. The particles interact with the surface to form a film thereover. This film renders the glass or plastic surface hydrophilic. The film is microporous, readily wetted and slowly permeable to water. Further, the film serves to contribute antistatic properties to the surface. The positively charged fibrils of alumina are attracted to the negative surface. Absorption of the fibrils will continue until the entire surface is covered with a layer of alumina fibrils and the surface is converted from a negative to a positive charged state. The film formed is porous and it is made relatively resistant to removal by the friction (rubbing) by a heating treatment. Areas missed in an original application or later rubbed off can be easily recovered by spraying or other coating methods. It should be noted that the exhaustion of the alumina particles on the surface is dependent upon the concentration of alumina employed and also upon pH conditions. It is, however, relatively unaffected by temperature conditions. The amount of alumina required to cover the surface when the alumina particles lie flat is given by the formula: Percent by weight of alumina (based on the substrate) is equal to $0.1 \times$ the specific surface area of the substrate (in m.$^2$/g.) for Baymal and Alon or microporous materials having high specific surface area. "Baymal" and "Alon" are powerful adsorbents. The colloidal alumina particles, being fibrous in nature, tend to associate with each other in water to form a network of particles or relatively close-packed fibrils of colloidal alumina. The fibrils are probably bound to one another by hydrogen bonding.

Colloidal dispersions of 10–40% alumina are highly gelatinous fluids or heavy thixotropic pastes at a pH of 4. Their viscosity can be greatly increased by merely adding strong acid or base. The high viscosity of highly concentrated dispersions, i.e., 10% or higher, makes the preparation of a homogeneous dispersion difficult. One can, however, achieve good homogeneity with the use of medium sheer internal mixers. For handling convenience, however, it is advantageous to reduce the viscosity of the concentrated dispersion. This is readily accomplished by subjecting the dispersion to high sheer. The use of a colloid mill is particularly recommended for this purpose. In preparing the alumina dispersion, care should be taken to use water that is substantially salt free, that is, uncontaminated with sulfates, phosphates or silicates, as it is difficult to disperse the alumina in water that contains salt. The presence of salts, particularly the salts of polyvalent anions, tends to increase viscosity and thixotropy. Aluminum salts are the worst offenders. In preparing the alumina dispersion, it should be noted that if only hard water is available, the addition of a small percent of acid as, for example, 0.1% of acetic acid, to the water will help in the dispersion. If a higher concentration of sulfates is present in the water, the addition of barium acetate, to precipitate the sulfate, followed by filtration of the insoluble sulfates, is recommended.

The plastic surface to be coated with the formulation of the method of the invention often contains a grease-like film thereon. This film interferes with wetting of the surface by the alumina dispersion and consequently interferes with the adhesion of the alumina to the glass or plastic. It has been found that this problem is obviated by the addition of an anionic or nonionic wetting agent to the alumina dispersion.

A suitable surfactant that has been found to be effective for this purpose is "Tergitol TMN," a nonionic surfactant. "Tergitol TMN" is a product and trademark of Union Carbide and is trimethyl nonyl polyethylene glycol ether, a nonionic surfactant. Another satisfactory surfactant is "Tergitol 15–S–7," which is polyethylene glycol ether of linear alcohol, also a nonionic surfactant. Another satisfactory surfactant is "Methocel MC 15 Premium," a product and trademark of Dow Chemical Company, Midland, Mich., for its methyl ether of cellulose (methylcellulose), a nonionic surfactant having a viscosity of 15 in centipoises in 2 percent aqueous solution at 20° C. Other satisfactory surfactants are "Sipex BOS," a product of Alcolac Chemical Co., which is sodium 2-ethylhexyl sulfate, and "Igepal CO 430," which is nonyl phenoxy ((ethyleneoxy) ethanol. Cationic surfactants should be avoided as they are incompatible with the electropositive colloidal alumina.

Preferably, to improve the ability of the dried coating to remain on the surface, the dispersion is applied while it is hot (over 160° F.), for example, about 200° F. Alternatively, the dispersion may be applied cold and the plastic or other surface heated while the dispersion is still wet. For example, plastic sheet material may be sprayed with cold liquid dispersion. Then the sheet is heated, to in excess of 160° F., by a wallpaper remover type of heated implement. The plastic is preferably thereby heated to the steam temperature (212° F.) and either side of the plastic sheet may be heated. The heat helps fix the coating to the surface after the water of the dispersion dries.

The following examples are submitted to illustrate the method of the invention, and are not submitted for purposes of limitation thereof.

EXAMPLE I

An Alon dispersion is prepared as follows: 30 g. of Alon are dispersed in 70 cc. of water. The Alon alumina powder is added to this vortex rapidly in order to wet it and form a uniform slurry before the alumina particles begin to swell. Stirring is maintained as the viscosity builds up. Any entrained air is removed by vacuum de-aeration, by permitting the dispersion to stand, or by gently heating and stirring the dispersion. The quality of the dispersion can be ascertained by streaking a layer of dispersion a few millimeters thick upon a glass surface. A good dispersion will appear to be translucent. The pH of the dispersion is adjusted by adding acetic acid thereto to bring the pH to 4.0. This dispersion is then utilized as part of a concentrate for preparing an end product. The concentrate may be shipped and sold and the final dilute solution prepared by the ultimate user. The concentrate is prepared as follows: 51 cc. of water is placed in a suitable vessel. Then 0.05 cc. of an anti-foam agent is mixed into the solution. The surfactants 2 cc. of Tergitol TMN and 0.225 of Sipon ES are then added, followed by the addition of 36 cc. of the 30% Alon dispersion, the mixture being meanwhile mixed. Preferably the de-foaming agent is of Dow-Corning's anti-foam "C." The mixture is agitated until uniform. The concentrate, of about 3 fluid oz., when ready to be used, is diluted with water to attain a final volume of one gallon. This dilute end-product is then ready for spraying or application to the plastic surface.

An alternative anti-foam is Dow-Corning's "B" anti-foam or other silicon emulsion anti-foam material.

EXAMPLE II

An Alon dispersion is prepared as in Example I, with 30 g. of Alon dispersed in 70 cc. of water. A surfactant solution is prepared using Methocel MC 15 by mixing 10 gm. of Methocel MC 15 in one quart of water. A concentrate is prepared as follows: Mix together 35 cc. of water, 30 cc. of the 30% Alon dispersion and 25 cc. of the Methocel MC 15 solution (10 gm./qt. water). This produces about 3 fluid ounces of concentrate. The user will dilute the concentrate with one gallon of water for application to flexible plastic sheet material and with three gallons of water for application to rigid plastic sheet material. In the 90 cc. of concentrate, by weight, there are 38.28 gm. of 30% Alon dispersion (11.484 gm. of Alon solids) and 25 gm. of Methocel MC 15 solution (0.265 gm. Methocel MC 15 solid). In the one gallon dilution there are 0.30% by weight of Alon solids and 0.007% by weight of Methocel MC 15 solids. In the three gallon dilution there are 0.10% by weight of Alon solids and 0.002% by weight of Methocel MC 15 solids.

In the examples given above, the suitable range of the anti-foam is from .05 cc. to .25 cc, which is about 0.0013 to 0.0066% by weight of the final dilute dispersion. The range of the surfactants in the Example I may be from 2 cc. to 20 cc., which is a range of 0.053% to 0.53% by weight of the final dilute dispersion. In Example II the range of the surfactant is from 0.002% by weight to 0.007% by weight. Generally a sufficient amount of surfactant is used to wet the surface of the plastic sheet. The range of alumina dispersion, in the formula of Example I, may be from 20 cc., not mentioned in the example, to 80 cc., which is in the range from 0.2% to 0.8% by weight of the final dilute dispersion. In Example II the range of alumina dispersion may be from 0.1% by weight to 0.3% by weight. The alumina will be 0.1% to 0.8% by weight of the final diluted dispersion, although more than 0.8% may be used.

Three fluid ounces of either of the above-mentioned concentrates (of Example I or of Example II) were diluted with water to a final volume of 1 gallon. This dilution was sprayed upon plastic sheet material, such plastics as polyethylene and vinyl. One gallon of the dilution was found to be capable of covering 800 to 1,000 sq. ft. of test surface. In all cases, the diluted formulation dried to form an invisible film.

A greenhouse constructed of flexible plastic sheet material was sprayed with the above-mentioned dilution under conditions of high humidity. The formulation was found to successfully prevent drippage. The water condensate was observed to be sheeting off the greenhouse surfaces and down the walls. The greenhouse was then dried out and the humidity was subsequently raised to a level equivalent to the humidity conditions under which the formulation was initially sprayed. There was no reapplication of the diluted formulation. The invisible film again succeeded in preventing drippage by sheeting out condensed moisture..

It should be noted that, although the formulation was evaluated on polyethylene and vinyl surfaces (polyvinyl chloride), it will work also on other surfaces, as, for example, styrene, acrylic, fiberglass and Plexiglas (tm).

Further, it should be noted also that the method of the instant invention may be used in conjunction with a solar still. In a solar still, sea water is confined in a structure which is enclosed at its top by clear plastic sheeting. The sea water is heated by the sun's rays, evaporated and leaves behind dissolved impurities such as salt. The evaporated moisture condenses on the interior surfaces of the plastic sheeting and drips down in multidrops, thus making condensate collection difficult. According to the method of the invention, the plastic sheet surfaces are treated with the formulation of the Example I. The condensed moisture is found to now sheet off down the sides of the enclosed structure, where it may be readily collected.

The method of the present invention results in an increase in light transmittal and a temperature rise. For example, tests have shown that, in a plastic greenhouse or solar still, an increase of 50% in light transmittal, under some conditions, on some plastics, may be expected. The increased light transmittal due to the method of the present invention is important, for example, in the growth of greenhouse crops.

We claim:

1. A method for preventing condensate build-up on the interior surfaces of an enclosed structure such as a greenhouse, pool enclosure or a solar still having therein highly humidity, the said surfaces upon which the build-up condensate is prevented consisting of a flexible or rigid plastic sheet material, which method comprises the steps of applying a formulation onto the said surfaces to form a coating thereon, said formulation consisting of 0.1% to 0.8% by weight of a colloidal alumina, 0.002% to 0.53% by weight of an anionic or nonionic surfactant, with the balance of said formulation being water, and permitting the said formulation to be the inner coating on the said sheet material by not covering or coating the said formulation with an additional coating.

2. A method as described in claim 1 wherein said formulation also contains 0.0013% to 0.0066% by weight of an anti-foam agent.

3. A method as described in claim 2 wherein said surfactant is sodium lauryl ethyl sulfate containing 3.5 mols of ethylene oxide and said anti-foam agent is a silicon emulsion.

4. A method as described in claim 1 wherein said surfactant is a trimethyl nonyl ether of polyethylene glycol containing 6 mols of ethylene oxide and said anti-foam agent is a silicone emulsion.

5. A method as described in claim 1 wherein the formulation is applied by spraying.

6. A method as described in claim 1 wherein the enclosure is a solar still and the sheeted-off moisture is collected in a receptacle therefor.

7. A method as described in claim 1 wherein the formulation is applied while it is hot at over 160° F.

8. A method as described in claim 1 wherein the method includes the additional step of heating the said surfaces to over 160° F. after the formulation is coated thereon and while the formulation is still wet.

References Cited

UNITED STATES PATENTS

| | | | |
|---|---|---|---|
| 3,013,901 | 12/1961 | Bugosh | 117—169 X |
| 2,413,101 | 12/1946 | Delano | 202—234 |
| 3,095,670 | 7/1963 | Raab | 47—17 |

OTHER REFERENCES

Von Fischer et al., Organic Protective Coatings, article "Antifoaming Agents," pp. 287–290, TP 935, V6 or C.3, 1953.

WILLIAM D. MARTIN, Primary Examiner

S. L. CHILDS, Assistant Examiner

U.S. Cl. X.R.

106—13; 117—138.8 E, 138.8 UA